Jan. 12, 1965   J. E. BARRICK   3,165,006
DRIVE UNIT
Filed Sept. 28, 1962   2 Sheets-Sheet 1

INVENTOR.
JAMES E. BARRICK
BY Woodling, Krost,
Granger and Rust
ATTORNEYS

Jan. 12, 1965  J. E. BARRICK  3,165,006
DRIVE UNIT
Filed Sept. 28, 1962  2 Sheets-Sheet 2

INVENTOR.
JAMES E. BARRICK
BY Woodling, Krost,
Granger and Reust
ATTORNEYS

United States Patent Office 3,165,006
Patented Jan. 12, 1965

3,165,006
DRIVE UNIT
James E. Barrick, Alliance, Ohio, assignor to Consolidated Electronics Industries Corporation, a corporation of Delaware
Filed Sept. 28, 1962, Ser. No. 226,899
9 Claims. (Cl. 74—421)

The invention relates in general to drive units and, more particularly, to speed reduction drive units which may be used to drive a slowly rotating load such as a spit or rotisserie.

Spit drive units have been manufactured and sold which include a sub-fractional horsepower electric motor and speed reducing gear train to a socket to receive a rotatable spit. In such drive units, difficulty has been experienced in maintaining tolerances, especially in the bearings and alignment of the bearings and in end play of the gears and shafts. This is especially true where a unit economical to manufacture is desired.

Accordingly, an object of the invention is to provide a speed reducing drive unit which obviates the aforementioned difficulties.

Another object of the invention is to provide a drive unit incorporating improved bearing means both radial and axial.

Another object of the invention is to provide a drive unit with non-circular portions of reduced cross-sectional area on the final drive hub to accommodate the increased torque at the final drive member with these non-circular portions ending in shoulder means to positively axially locate a gear on the hub.

Another object of the invention is to space a final drive gear from a head or lock ring on a hub so that axial thrust on the hub is not transmitted to the gear to cause it to be moved out of alignment.

Another object of the invention is to provide a hub on a final drive member which has two reduced cross-sectional area portions, one to receive a lock ring for thrust bearing reaction and the other to receive a final drive gear.

Other objects and a fuller understanding of the invention may be had by referring to the following description and claims, taken in conjunction with the accompanying drawings, in which:

Figure 2:
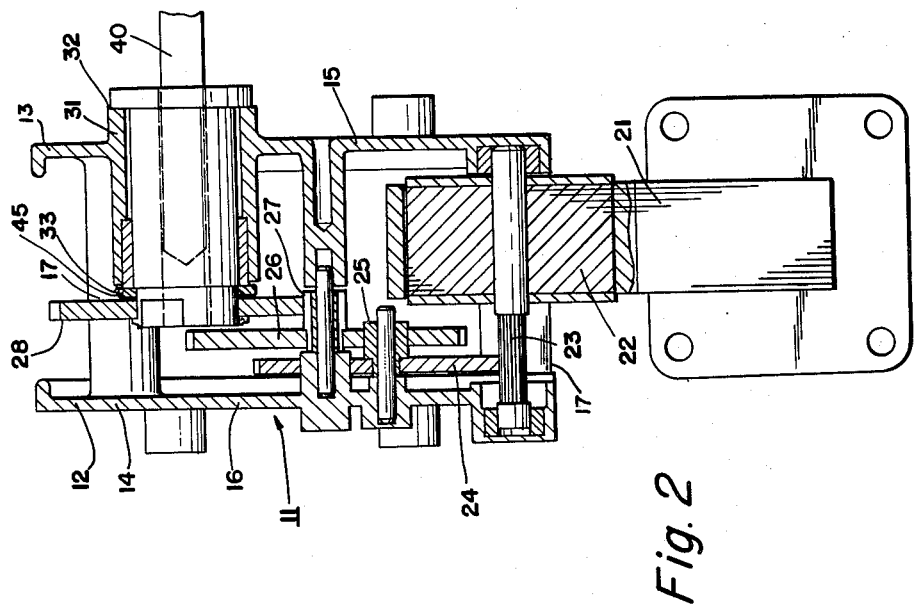
FIGURE 2 is a sectional view on line 2—2 of FIGURE 1.
Figure 1:
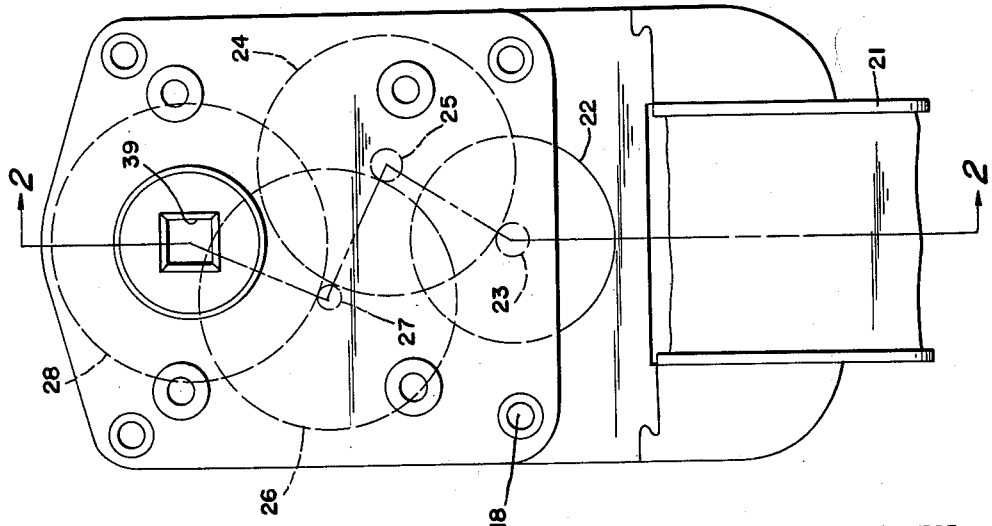
FIGURE 1 is a front view of a spit drive unit incorporating the invention.
Figure 3:
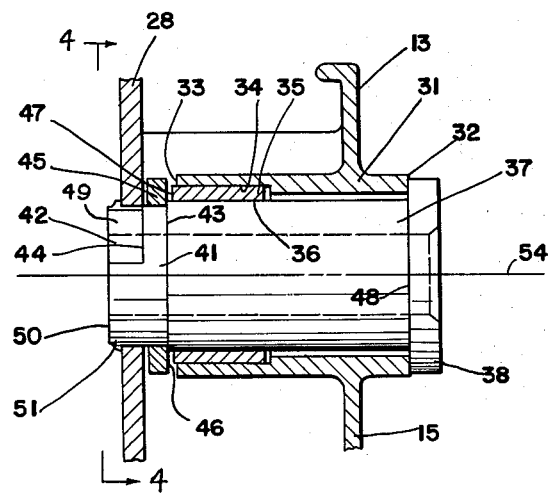
FIGURE 3 is an enlarged sectional view of the final drive hub.
Figure 4:
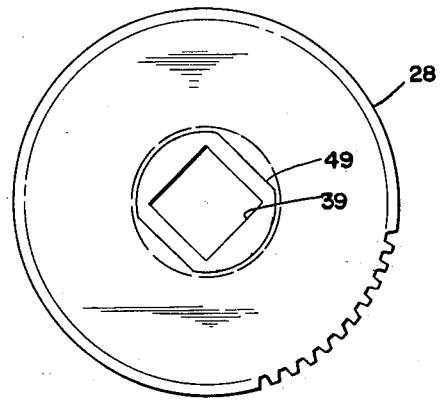
FIGURE 4 is an enlarged end view of the hub on line 4—4 of FIGURE 3.

The figures of the drawing show a drive unit 11 which embodies the invention but is not the only form which the invention may take. This drive unit 11 includes a frame 12 which generally includes first and second frame halves 13 and 14, respectively. The frame half 13 may be considered the front frame half and the frame halves 13 and 14 have first and second frame plates 15 and 16, respectively. These frame plates are generally parallel and spaced by spacers 17. Bolts or rivets 18 may extend through the spacers 17 to secure together the two frame halves.

The frame halves 13 and 14 may be made by any suitable means such as diecasting and may be made of suitable diecasting metal such as zinc. This permits close tolerance of dimensions of the finished frame halves without subsequent machining.

An electric motor 21 is fixedly carried in the frame 12 and has a rotor 22 to drive a pinion 23. This pinion 23 drives through a gear 24, a pinion 25, a gear 26 and a pinion 27 to a final drive gear 28. The gears and pinions 23–27 are carried on shafts journalled in the frame halves 13 and 14.

The front frame plate 15 fixedly carries a sleeve 31 which is integral with this front frame plate 15. A small portion of the sleeve 31 extends forwardly of the frame plate 15 and a majority extends rearwardly. The sleeve 31 has first and second end surfaces 32 and 33, respectively. The rearward end of the sleeve 31 has a recess 34 which fixedly receives a cylindrical bearing 35 therein. This bearing 35 may be press fitted into place. The inner cylindrical surface 36 of the bearing 35 may be accurately dimensioned to provide a journal surface for a hub 37. This inner cylindrical surface 36 provides a radial bearing for the hub 37.

The hub 37 has an enlarged head 38 integral therewith at the forward or outboard end of the sleeve 31. A polygonal socket 39 extends longitudinally completely through the hub 37 to receive a spit 40 shown in phantom in FIGURE 2.

The inner end of the hub 37 has first and second reduced cross-sectional area portions 41 and 42, respectively. First and second radial shoulder means 43 and 44, respectively, are provided on the hub 37. The first radial shoulder means 43 is disposed between the first reduced cross-sectional area portion 41 and the portion of the hub 37 which is journalled in the bearing 35. The second radial shoulder means 44 is provided between the first and second reduced area portions 41 and 42. The first reduced area portion 41 is cylindrical and receives a lock ring 45 which may be of stamped cold rolled steel, for example, and is press fitted on this first reduced area portion 44 and axially engages the first radial shoulder means 43. This lock ring 45 has an inner surface 46 which acts in thrust bearing reaction against the inner end surface 47 of the bearing 35. The under surface 48 of the first head 38 is disposed in thrust bearing reaction with the end surface 32 of the sleeve 31.

The final drive gear 28 is disposed on the second reduced cross-sectional area portion 42 and is disposed axially in engagement with the second radial shoulder means 44. The second reduced area portion 42 is non-circular in cross-section and may be polygonal in cross-section or, as shown, may be provided with two oppositely disposed flats 49. This non-circular cross-section corresponds to a complementary aperture in the gear 28 and, thus, these two members are non-rotatably secured together so that the increased torque at this final drive gear may be satisfactorily transmitted to the hub 37. The inner end 50 of the hub 37 is staked as at 51 to axially secure the gear 28 to the hub 37.

The hub 37 may be made of a sintered metal, for example, and may be made of sintered iron with a small amount of copper to promote fusing of the powdered metal particles. Such sintered metal part may be made with considerable accuracy as to tolerances in the dimensions so as to preclude further machining. Also, the sintered metal is somewhat porous to absorb lubricant at the time of manufacture and to release this lubricant upon demand, especially when heated during running conditions. The bearing 35 may be made from a sintered bronze which also is porous to retain and later release lubricant as needed. The bearing 35 is made from a metal different from that of the hub 37 for good bearing properties and is also of a metal different from that of the lock ring 45, again for good bearing properties in a thrust bearing reaction. Also, the enlarged head 38 is of a metal different from that of the end surface 32 of the frame plate 15 to provide good bearing qualities. The porous lubricant holding and releasing properties of the head 38 also promote these good bearing qualities.

The thickness of the lock ring 45 is less than the axial distance between the radial shoulder means 43 and 44. This establishes a space between the gear 28 and the lock ring 45. This has the advantage that any axial force on the hub 37, such as may be caused by shocks during shipment or as may be caused by careless insertion of the spit 40, will not be transmitted to the gear 28. If such axial forces were transmitted to the gear 28, they might possibly force this gear out of the preferred position normal to the axis 54 of this hub 37. The proper running position of the gear 28 is normal to the axis 54 to insure proper gear meshing with the pinion 27.

The lock ring 45 may be considered a second head on the hub 37. The inner surface 46 thereof has a thrust bearing reaction with the end surface 47 of the bearing 35. The axial distance between the shoulder means 43 and the inner surface 48 of the head 38 may be closely controlled in the manufacture of this hub 37 and, hence, the amount of end play of the hub 37 may be closely controlled. A slight clearance for this end play is desired for free running but excess end play may easily be avoided with this present design.

The bearing 35 is provided at the inner end of the sleeve 31 for two reasons. The first is that this bearing position thus provides proper radial positioning of the gear 28 and pinion 27 and this radial positioning is better controlled with the bearing 35 at the inner end of the sleeve 31 than it would be if located at the outer end of the sleeve 31. The second reason is that the bearing 35 thus has an exposed inner end 47 to provide the above mentioned thrust bearing surface.

The entire drive unit 11 may be economically manufactured and assembled. The diecast frame halves 13 and 14 may be manufactured with only two part molds each for maximum economy. The train of gears 24–27 may be assembled on the second frame half 14 and the motor 21 may also be assembled on this frame half 14. The hub 37 may be inserted from the front of the frame half 13 with the lock ring pressed on from the rear to axially lock in place the hub 37. Next, the final drive gear 28 may be placed on the reduced area portion 42 and staked in place at 51. Then the two frame halves 13 and 14 may be assembled together and riveted together to complete the entire drive unit. Thus, the complete drive unit 11 provides a structure which is economical to manufacture and assemble and one wherein tolerances and dimensions and alignments of bearing surfaces, as well as alignment of gears and pinions is readily achieved.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A speed reduction drive unit comprising in combination, a frame,
  a sleeve fixed in said frame and having an axis,
  a metal hub journalled in said sleeve along said axis,
  said sleeve having a cylindrical bearing surface defining a radial bearing with said hub and having two end thrust bearing surfaces,
  said hub having a head outboard of said frame and disposed in thrust bearing reaction with one of said end surfaces,
  a second head fixed on said hub and disposed in thrust bearing reaction with the other of said end surfaces,
  shoulder means on said hub adjacent the inner end thereof,
  a gear fixed on said hub and axially engaging said shoulder means,
  said second head having a thickness less than the axial distance between said shoulder means and said other end surface of said sleeve to axially space said gear from said second head,
  drive means in said frame,
  and speed reduction gearing drivingly connecting said drive means to said gear.

2. A speed reduction drive unit comprising in combination, a frame,
  a sleeve fixed in said frame and having an axis,
  a metal hub journalled in said sleeve along said axis,
  said sleeve having a cylindrical bearing surface defining a radial bearing with said hub and having two end thrust bearing surfaces,
  said hub having a head outboard of said frame and disposed in thrust bearing reaction with one of said end surfaces,
  a second head fixed on said hub and disposed in thrust bearing reaction with the other of said end surfaces,
  a reduced cross sectional area portion on said hub adjacent the inner end thereof,
  radial shoulder means disposed between said reduced portion and the portion of said hub journalled in said bearing,
  a gear fixed on said reduced portion and axially engaging said shoulder means,
  said second head having a thickness less than the axial distance between said radial shoulder means and said other end surface of said sleeve to axially space said gear from said second head,
  drive means in said frame,
  and speed reduction gearing drivingly connecting said drive means to said gear.

3. A spit drive unit comprising in combination, a frame,
  a sleeve fixed in said frame and having an axis,
  a cylindrical bearing fixed in said sleeve,
  a metal hub journalled in said bearing along said axis,
  said hub having a socket to receive and drive a spit,
  said hub having a head outboard of said frame,
  a lock ring fixed on said hub and together with said head locking said hub axially in place in said frame by reaction with said sleeve and one end of said bearing,
  a reduced cross sectional area portion on said hub adjacent the inner end thereof,
  radial shoulder means disposed between said reduced portion and the portion of said hub journalled in said bearing,
  a gear fixed on said reduced portion and axially engaging said shoulder means,
  said lock ring having a thickness less than the axial distance between said radial shoulder means and said one end of said bearing to axially space said gear from said lock ring,
  and drive means in said frame drivingly connected to drive said gear.

4. A spit driven unit comprising in combination, a frame,
  a sleeve fixed in said frame and having an axis,
  a cylindrical bearing fixed in said sleeve,
  a metal hub journalled in said bearing along said axis,
  a polygonal socket coaxially extending in said hub to receive a complementarily shaped spit,
  said hub having an integral enlarged head outboard of said frame,
  first and second reduced cross sectional area portions on said hub adjacent the inner end of said bearing,
  first shoulder means disposed between said first reduced portion and the portion of said hub journalled in said bearing,
  a lock ring fixed on said first reduced portion and axially bearing against said first shoulder means,
  said lock ring and said integral head locking said hub axially in place in said frame by reaction with said sleeve and said inner end of said bearing,
  second shoulder means disposed between said first and second reduced portions, a gear fixed on said second reduced portion and axially engaging said second shoulder means, said lock ring having a thickness less than the axial distance between said first and second shoulder means to axially space said gear from said lock ring, and drive means in said frame drivingly connected to drive said gear.

5. A spit drive unit comprising in combination, a frame, a sleeve fixed in said frame and having an axis, a cylindrical bearing fixed in said sleeve and having one exposed inner end.

a metal hub journalled in said bearing along said axis, a polygonal socket coaxially extending completely through said hub to receive a complementarily shaped spit, said hub having an integral enlarged head outboard of said frame, first and second reduced cross sectional area portions on said hub adjacent the exposed inner end of said bearing, first radial shoulder means disposed between said first reduced portion and the portion of said hub journalled in said bearing, a lock ring fixed on said first reduced portion and axially bearing against said first radial shoulder means, said lock ring and said integral head locking said hub axially in place in said frame by reaction with said sleeve and said exposed inner end of said bearing, second radial shoulder means disposed between said first and second reduced portions, a gear fixed on said second reduced portion and axially engaging said second shoulder means, said lock ring having a thickness less than the axial distance between said first and second radial shoulder means to axially space said gear from said lock ring, and drive means in said frame drivingly connected to drive said gear.

6. A spit drive unit comprising in combination, a frame, said frame having first and second frame halves each with an outboard frame plate, a sleeve fixed in said first frame half having an axis generally normal to said frame plates and extending through said first frame plate toward said second frame plate, a cylindrical bearing fixed in said sleeve, a metal hub journalled only in said bearing along said axis, a socket coaxially extending completely through said hub to receive a spit, said hub having an integral enlarged head outboard of said first frame half, first and second reduced diameter portions on said hub adjacent the inner end of said bearing, first radial shoulder means disposed between said first reduced diameter portion and the portion of said hub journalled in said bearing, a lock ring press fitted on said first reduced diameter portion and axially bearing against said first radial shoulder means, said lock ring and said integral head locking said hub axially in place in said first frame half, second radial shoulder means disposed between said first and second reduced diameter portions, a gear fixed on said second reduced diameter portion and axially engaging said second shoulder means, said lock ring having a thickness less than the axial distance between said first and second radial shoulder means to axially space said gear from said lock ring, the inner end of said hub being staked to stake said gear to said hub, an electric motor fixedly carried on said frame and having an output pinion, and a gear train drivingly connecting said gear to said output pinion.

7. A spit drive unit comprising in combination, a frame, said frame havng first and second frame halves each with an outboard frame plate, an integral sleeve fixed in said first frame half having an axis generally normal to said frame plates and extending through said first frame plate toward said second frame plate, a cylindrical bearing fixed in said sleeve, a metal hub journalled in said bearing along said axis, a polygonal socket coaxially extending completely through said hub to receive a spit, said hub having an integral enlarged head outboard of said first frame half, a first reduced diameter portion on said hub adjacent the inner end of said bearing, a radial shoulder disposed between said reduced diameter portion and the portion of said hub journalled in said bearing, a lock ring press fitted on said first reduced diameter portion and axially bearing against said radial shoulder, said lock ring and said integral head locking said hub axially in place in said first frame half, a second reduced diameter portion of polygonal cross section on the inner end of said hub, a gear fixed on said second reduced diameter portion, the inner end of said hub being staked to stake said gear to said hub with said gear spaced from said lock ring, an electric motor fixedly carried on said frame and having an output pinion, and a gear train drivingly connecting said gear and said output pinion.

8. A spit drive unit comprising in combination, a frame, said frame having first and second frame halves each with an outboard frame plate, an integral sleeve fixed in said first frame half having an axis generally normal to said frame plates and extending through said first frame plate toward said second frame plate, a metal hub journalled in said sleeve along said axis, a square socket coaxially extending completely through said hub to receive a spit, said hub having an integral enlarged head outboard of said first frame half, a reduced diameter cylindrical portion on said hub adjacent the inner end of said sleeve, a radial shoulder disposed between said reduced diameter portion and the portion of said hub journalled in said sleeve, a lock ring press fitted on said reduced diameter portion and axially bearing against said radial shoulder, said lock ring and said integral head locking said hub axially in place in said first frame half, a flat on said hub having an axial end near said ring, a gear fixed on said hub and having a planar surface inter-engaged with said flat, said gear engaging the axial end of said flat and spaced from said lock ring, an electric motor fixedly carried on said frame and having an output pinion, and a gear train drivingly connecting said gear and said output pinion.

9. A spit drive unit comprising in combination, a frame, an electric motor fixedly carried on said frame having an output pinion, said frame having first and second frame halves of die cast metal and each having an outboard frame plate, an integral sleeve fixed in said first frame half having an axis generally normal to said frame plates and having inner and outer ends, a cylindrical bearing fixed in the inner end of said sleeve and having an exposed inner end, a sintered metal hub journalled in said bearing along said axis, a square socket coaxially extending completely through said hub, said hub having an integral enlarged head to have a thrust bearing action with the outer end of said sleeve outboard of and adjacent the frame plate of said first frame half, a reduced diameter cylindrical portion on said hub adjacent the inner end of said bearing, a radial shoulder disposed between said reduced diameter portion and the portion of said hub journalled in said bearing, a steel ring press fitted on said reduced diameter portion and axially bearing against said radial shoulder, said steel ring forming a thrust bearing action with the exposed inner end of said cylindrical bearing to lock said hub axally in place in said first frame half, first and second diametrically opposed flats on said reduced diameter portion, a gear disposed on said hub reduced diameter portion and having planar surfaces inter-engaged with said flats, the inner end of said hub being staked to stake said gear to said hub with said gear engaging the axial end of said flats and spaced from said steel ring, and a gear train carried in said frame and drivingly connecting said gear and said output pinion.

References Cited in the file of this patent
UNITED STATES PATENTS

| | | |
|---|---|---|
| 1,514,851 | Gromley | Nov. 11, 1924 |
| 2,831,352 | Elliott et al. | Apr. 22, 1958 |